United States Patent
Gao et al.

(10) Patent No.: US 10,025,778 B2
(45) Date of Patent: Jul. 17, 2018

(54) TRAINING MARKOV RANDOM FIELD-BASED TRANSLATION MODELS USING GRADIENT ASCENT

(71) Applicant: Microsoft Corporation, Redmond, WA (US)

(72) Inventors: Jianfeng Gao, Woodinville, WA (US); Xiaodong He, Issaquah, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 61 days.

(21) Appl. No.: 14/182,615

(22) Filed: Feb. 18, 2014

(65) Prior Publication Data

US 2014/0365201 A1 Dec. 11, 2014

Related U.S. Application Data

(60) Provisional application No. 61/832,927, filed on Jun. 9, 2013.

(51) Int. Cl.
*G06F 17/28* (2006.01)
(52) U.S. Cl.
CPC .................. *G06F 17/2818* (2013.01)
(58) Field of Classification Search
CPC .................................................. G06F 17/2818
See application file for complete search history.

(56) References Cited

U.S. PATENT DOCUMENTS

| | | | |
|---|---|---|---|
| 6,233,546 B1 * | 5/2001 | Datig | G06F 17/271 704/7 |
| 7,454,326 B2 | 11/2008 | Marcu et al. | |
| 2005/0038643 A1 | 2/2005 | Koehn | |
| 2008/0120092 A1 | 5/2008 | Moore et al. | |
| 2010/0332423 A1 * | 12/2010 | Kapoor | G06N 5/045 706/12 |
| 2012/0101804 A1 * | 4/2012 | Roth | G06F 17/2818 704/2 |
| 2013/0110491 A1 | 5/2013 | He et al. | |

(Continued)

OTHER PUBLICATIONS

Talbot, et al., "Modelling Lexical Redundancy for Machine Translation", Retrieved at <<http://acl.ldc.upenn.edu/P/P06/P06-1122.pdf>>, In Proceedings of the 21st International Conference on Computational Linguistics and 44th Annual Meeting of the ACL, Jul. 17, 2006, 8 pages.

(Continued)

*Primary Examiner* — Lennin Rodriguezgonzale
(74) *Attorney, Agent, or Firm* — Medley, Behrens & Lewis, LLC

(57) ABSTRACT

Various technologies described herein pertain to training and utilizing a general, statistical framework for modeling translation via Markov random fields (MRFs). An MRF-based translation model can be employed in a statistical machine translation (SMT) system. The MRF-based translation model allows for arbitrary features extracted from a phrase pair to be incorporated as evidence. The parameters of the model are estimated using a large-scale discriminative training approach based on stochastic gradient ascent and an N-best list based expected Bilingual Evaluation Understudy (BLEU) as an objective function.

20 Claims, 9 Drawing Sheets

(56) References Cited

U.S. PATENT DOCUMENTS

| | | | | | |
|---|---|---|---|---|---|
| 2013/0311163 | A1* | 11/2013 | Somekh | ............... | G06N 99/005 703/21 |
| 2013/0325436 | A1* | 12/2013 | Wang | ................... | G06F 17/2715 704/9 |
| 2014/0149102 | A1* | 5/2014 | Marcu | ................. | G06F 17/2854 704/2 |

OTHER PUBLICATIONS

Rudnick, et al., "HLTDI: CL-WSD Using Markov Random Fields for SemEval-2013 Task 10", Retrieved at <<http://www.cs.indiana.edu/~alexr/pubs/hltdi-semeval-2013.pdf<<, Retrieval date: May 14, 2013, 7 Pages.
Zens, et al., "Phrase-Based Statistical Machine Translation", Retrieved at <<http://www-i6.informatik.rwth-aachen.de/publications/download/434/Zens-KI-2002.pdf>>, In Proceedings of the 25th Annual German Conference on AI: Advances in Artificial Intelligence, Sep. 16, 2002, 15 pages.
Davis, Eric H., "Integration of Morphology into Statistical Machine Translation", Retrieved at <<http://www.cs.cmu.edu/afs/cs.cmu.edu/project/cmt-55/lti/Courses/734/Spring-08/EricDavis-Integration%20of%20Morphology%20into%20Statistical%20Machine%20Translation.pdf>>, May 5, 2008, 13 Pages.
Blunsom, et al., "A Discriminative Latent Variable Model for Statistical Machine Translation", Retrieved at <<http://www.aclweb.org/anthology-new/P/P08/P08-1024.pdf>>, In Proceedings of the 46th Annual Conference of the Association for Computational Linguistics: Human Language Technologies, Jun. 15, 2008, 9 pages.
Brown, et al., "The Mathematics of Statistical Machine Translation: Parameter Estimation", Retrieved at <<http://acl.ldc.upenn.edu/J/J93/J93-2003.pdf>>, In Journal of Computational Linguistics—Special Issue on Using Large Corpora: vol. 19, Issue 2, Jun. 1993, 50 pages.
Chiang, David, "A Hierarchical Phrase-Based Model for Statistical Machine Translation", Retrieved at <<http://www.isi.edu/~chiang/papers/chiang-acl05.pdf>>, In Proceedings of the 43rd Annual Meeting on Association for Computational Linguistics, Jun. 25, 2005, 8 pages.
Chiang, et al., "11,001 New Features for Statistical Machine Translation", Retrieved at <<http://www.isi.edu/~chiang/papers/11001.pdf>>, In Proceedings of Human Language Technologies: The Annual Conference of the North American Chapter of the Association for Computational Linguistics, May 31, 2009, 9 pages.
Chiang, et al., "Online Large-Margin Training of Syntactic and Structural Translation Features", Retrieved at <<http://www.umiacs.umd.edu/~ymarton/pub/emnlp08/ChiangMartonResnik08_mira.pdf>>, In Proceedings of the Conference on Empirical Methods in Natural Language Processing, Oct. 25, 2008, 10 pages.
Denero, et al., "Why Generative Phrase Models Underperform Surface Heuristics", Retrieved at <<http://acl.ldc.upenn.edu/W/W06/W06-3105.pdf>>, In Proceedings of the Workshop on Statistical Machine Translation, Jun. 2006, 8 pages.
Duh, et al., "Beyond Log-Linear Models: Boosted Minimum Error Rate Training for N-best Re-ranking", Retrieved at <<http://ssli.ee.washington.edu/people/duh/papers/acl08boost.pdf>>, In Proceedings of the 46th Annual Meeting of the Association for Computational Linguistics on Human Language Technologies: Short Papers, Jun. 15, 2008, 4 pages.
Galley, et al., "What's in a Translation Rule?", Retrieved at <<http://www.isi.edu/~marcu/papers/cr_ghkm_naacl04.pdf>>, In Proceedings of the Human Language Technology and North American Association for Computational Linguistics Conference, May 2, 2004, 8 pages.
Gao, et al., "Learning Lexicon Models from Search Logs for Query Expansion", Retrieved at <<http://research.microsoft.com/pubs/166360/D12-1061.pdf>>, In Proceedings of the Joint Conference on Empirical Methods in Natural Language Processing and Computational Natural Language Learning, Jul. 12, 2012, 11 pages.
Gao, et al., "Linear Discriminant Model for Information Retrieval", Retrieved at <<http://atour.iro.umontreal.ca/rali/sites/default/files/publis/gao-sigir05.pdf>>, In Proceedings of the 28th Annual International ACM SIGIR Conference on Research and Development in Information Retrieval, Aug. 15, 2005, 8 pages.
Gimpel, et al., "Structured Ramp Loss Minimization for Machine Translation", Retrieved at <<http://ttic.uchicago.edu/~kgimpel/papers/gimpel+smith.naacl12.pdf>>, In Proceedings of the Conference of the North American Chapter of the Association for Computational Linguistics: Human Language Technologies, Jun. 2012, 11 pages.
Haghighi, et al., "Prototype-Driven Learning for Sequence Models", Retrieved at <<http://acl.ldc.upenn.edu/N/N06/N06-1041.pdf>>, In Proceedings of the Human Language Technology Conference of the North American Chapter of the Association of Computational Linguistics, Jun. 2006, 8 pages.
Hasan, et al., "Triplet Lexicon Models for Statistical Machine Translation", Retrieved at <<http://cs.jhu.edu/~juri/pdf/triplets-emnlp-2008.pdf>>, In Proceedings of the Conference on Empirical Methods in Natural Language Processing, Oct. 2008, 10 pages.
He, Xiaodong, "Using Word Dependent Transition Models in HMM Based Word Alignment for Statistical Machine Translation", Retrieved at <<http://research.microsoft.com/pubs/69476/WMT11.pdf>>, In Proceedings of the Second Workshop on Statistical Machine Translation, Jun. 2007, 8 pages.
He, et al., "Maximum Expected BLEU Training of Phrase and Lexicon Translation Models", Retrieved at <<http://research.microsoft.com/pubs/162393/HeDeng_acl12_dtmt_camera_07.pdf<<, In Proceedings of the 50th Annual Meeting of the Association for Computational Linguistics: Long Papers—vol. 1, Jul. 2012, 10 pages.
Hopkins, et al., "Tuning as Ranking", Retrieved at <<http://www.aclweb.org/anthology-new/D/D11/D11-1125.pdf>>, In Proceedings of the Conference on Empirical Methods in Natural Language Processing, Jul. 27, 2011, 11 pages.
Koehn, et al., "Manual and Automatic Evaluation of Machine Translation between European Languages", Retrieved at <<http://acl.ldc.upenn.edu/W/W06/W06-3114.pdf>>, In Proceedings of the Workshop on Statistical Machine Translation, Jun. 2006, 20 pages.
Koehn, et al., "Statistical Phrase-Based Translation", Retrieved at <<http://acl.ldc.upenn.edu/N/N03/N03-1017.pdf>>, In Proceedings of the Conference of the North American Chapter of the Association for Computational Linguistics on Human Language Technology—vol. 1, May 2003, 7 pages.
Lambert, et al., "Data Inferred Multi-word Expressions for Statistical Machine Translation", Retrieved at <<http://hal.archives-ouvertes.fr/docs/00/70/50/07/PDF/05_data_mwe_mtsummit.pdf>>, In Proceedings of Conference of the Tenth Machine Translation Summit, Sep. 12, 2005, 8 pages.
Liang, et al., "An End-to-End Discriminative Approach to Machine Translation", Retrieved at <<http://www.seas.upenn.edu/~taskar/pubs/acl06.pdf>>, In Proceedings of the 21st International Conference on Computational Linguistics and the 44th annual meeting of the Association for Computational Linguistics, Jul. 2006, 8 pages.
Marcu, et al., "A Phrase-Based, Joint Probability Model for Statistical Machine Translation", Retrieved at <<http://www.isi.edu/~marcu/papers/jointmt2002.pdf>>, In Proceedings of the ACL-02 Conference on Empirical methods in Natural Language Processing—vol. 10, Jul. 6, 2002, 7 pages.
Metzler, et al., "A Markov Random Field Model for Term Dependencies", Retrieved at <<http://citeseerx.ist.psu.edu/viewdoc/download?doi=10.1.1.61.1097&rep=rep1&type=pdf>>, In Proceedings of the 28th Annual International ACM SIGIR Conference on Research and Development in Information Retrieval, Aug. 15, 2005, 8 pages.
Metzler, et al., "Latent Concept Expansion Using Markov Random Fields", Retrieved at <<http://maroo.cs.umass.edu/pdf/IR-504.pdf>>, In Proceedings of the 30th Annual International ACM SIGIR Conference on Research and Development in Information Retrieval, Jul. 23, 2007, 8 pages.

(56) References Cited

OTHER PUBLICATIONS

Morgan, et al., "Direct Maximization of Average Precision by Hill-Climbing, with a Comparison to a Maximum Entropy Approach", Retrieved at <<http://acl.ldc.upenn.edu/N/N04/N04-4024.pdf>>, In Proceedings of HLT-NAACL: Short Papers, May 2, 2004, 4 pages.

Moore, et al., "Faster Beam-Search Decoding for Phrasal Statistical Machine Translation", Retrieved at <<http://research.microsoft.com/pubs/68097/nntsummit2007_beamsearch.pdf>>, In Proceedings of MT Summit XI, Sep. 2007, 7 pages.

Och, et al., "The Alignment Template Approach to Statistical Machine Translation", Retrieved at <<http://acl.ldc.upenn.edu/J/J04/J04-4002.pdf>>, In Journal of Computational Linguistics vol. 40, Issue 4, Dec. 2004, 33 pages.

Och, Franz Josef, "Minimum Error Rate Training in Statistical Machine Translation", Retrieved at <<http://acl.ldc.upenn.edu/acl2003/main/pdfs/Och.pdf>>, In Proceedings of the 41st Annual Meeting of the Association for Computational Linguistics, vol. 1, Jul. 2003, 8 pages.

Papineni, et al., "BLEU: A Method for Automatic Evaluation of Machine Translation", Retrieved at <<http://acl.ldc.upenn.edu/P/P02/P02-1040.pdf>>, In Proceedings of the 40th Annual Meeting of the Association for Computational Linguistics, Jul. 2002, 8 pages.

Rosti, et al., "Expected BLEU Training for Graphs: BBN System Description for WMT11 System Combination Task", Retrieved at <<http://www.mt-archive.info/WMT-2011-Rosti.pdf>>, In Proceedings of the Sixth Workshop on Statistical Machine Translation, Jul. 30, 2011, 7 pages.

Shen, et al., "Discriminative Reranking for Machine Translation", Retrieved at <<http://acl.ldc.upenn.edu/N/N04/N04-1023.pdf>>, In Human Language Technology Conference of the North American Chapter of the Association for Computational Linguistics, May 2, 2004, 8 pages.

Simianer, et al., "Joint Feature Selection in Distributed Stochasic Learning for Large-Scale Discriminative Training in SMT", Retrieved at <<http://www.cs.cmu.edu/~cdyer/simianer-riezler-dyer.acl2012.pdf>>, In Proceedings of the 50th Annual Meeting of the Association for Computational Linguistics: Long Papers—vol. 1, Jul. 2012, 11 pages.

Tillmann, et al., "A Discriminative Global Training Algorithm for Statistical MT", Retrieved at <<http://stat.rutgers.edu/home/tzhang/papers/acl06-mt.pdf>>, In Proceedings of the 21st International Conference on Computational Linguistics and the 44th annual meeting of the Association for Computational Linguistics, Jul. 17, 2006, 8 pages.

Watanabe, et al., "Online Large-Margin Training for Statistical Machine Translation", Retrieved at <<http://www.aclweb.org/anthology-new/D/D07/D07-1080.pdf>>, In Proceedings of the Joint Conference on Empirical Methods in Natural Language Processing and Computational Natural Language Learning, Jun. 2007, 10 pages.

Wuebker, et al., "Training Phrase Translation Models with Leaving-One-Out", Retrieved at <<https://www.google.com/url?sa=t&rct=j&q=&esrc=s&source=web&cd=1&cad=rja&ved=0CCoQFjAA&url=http%3A%2F%2Fwww-i6.informatik.rwth-aachen.de%2Fpublications%2Fdownload%2F668%2Fwuebker-acl-2010.pdf&ei=pxeTUfu2G4LrrQe5yoGQAw&usg=AFQjCNHSoOhs5WMUMIb7I_A7FACsXEco1w&sig2=x5Bsk6wACyqYyxyqkF_wEA>>, In Proceedings of the 48th Annual Meeting of the Association for Computation Linguistics, Jul. 11, 2010, 10 pages.

\* cited by examiner

TRAINING MARKOV RANDOM FIELD-BASED TRANSLATION MODELS USING GRADIENT ASCENT

CROSS-REFERENCE TO RELATED APPLICATION

This application claims priority to U.S. Provisional Patent Application No. 61/832,927, filed on Jun. 9, 2013, and entitled "TRAINING MARKOV RANDOM FIELD-BASED TRANSLATION MODELS USING GRADIENT ASCENT", the entirety of which is incorporated herein by reference.

BACKGROUND

Various types of machine translation systems are commonly employed to translate text or speech from a source language to a target language. Examples of machine translation systems include rule-based machine translation systems, example-based machine translation systems, and statistical machine translation (SMT) systems. In contrast to approaches utilized for rule-based machine translation systems or example-based machine translation systems, SMT systems can generate translations based upon statistical translation models with parameters derived from analysis of bilingual text corpora.

A phrase translation model, also known as a phrase table, can be one of the models of a phrase-based SMT system. A phrase table is commonly constructed by implementing a two-phase approach. As part of such two-phase approach, bilingual phrase pairs can be extracted heuristically from automatically word-aligned training data. Thereafter, parameter estimation can be performed. Conventional parameter estimation techniques oftentimes include assigning each phrase pair a score estimated based on counting of words or phrases on the same word-aligned training data.

SUMMARY

Described herein are various technologies that pertain to training and utilizing a general, statistical framework for modeling translation via Markov random fields (MRFs). An MRF-based translation model can be employed in a statistical machine translation (SMT) system. The MRF-based translation model allows for arbitrary features extracted from a phrase pair to be incorporated as evidence. For instance, one or more scores generated using the MRF-based translation model can be assigned to phrase pairs; such scores generated using the MRF-based translation model can be assigned in addition to scores estimated by other techniques (e.g., conventional counting based techniques, using disparate model(s), etc.). The parameters of the MRF-based translation model can be estimated using a large-scale discriminative training approach based on stochastic gradient ascent and an N-best list based expected Bilingual Evaluation Understudy (BLEU) as an objective function.

In accordance with various embodiments, the SMT system can receive an input string in a source language and can generate an output string in a target language based upon the input string. The SMT system can include an MRF-based phrase translation model. Further, the SMT system can evaluate scores of phrase translation pair hypotheses between the source language and the target language utilizing the MRF-based phrase translation model based upon a source phrase included in the input string in the source language. Moreover, the output string in the target language can be generated as a function of the scores of the phrase translation pair hypotheses.

Moreover, pursuant to various embodiments, the MRF-based phrase translation model can be trained for the SMT system. Respective N-best lists of translation hypotheses for source sentences in training data can be generated. Further, respective objective function scores for the translation hypotheses can be computed. Moreover, respective translation scores for the translation hypotheses can be computed using current parameters of the MRF-based phrase translation model for the SMT system. The parameters of the MRF-based phrase translation model can further be updated utilizing stochastic gradient ascent based on the objective function scores and the translation scores for the translation hypotheses.

According to various embodiments set forth herein, offline training of the MRF-based phrase translation model can be utilized. Pursuant to other embodiments, online adaptation of the MRF-based translation model can be employed.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
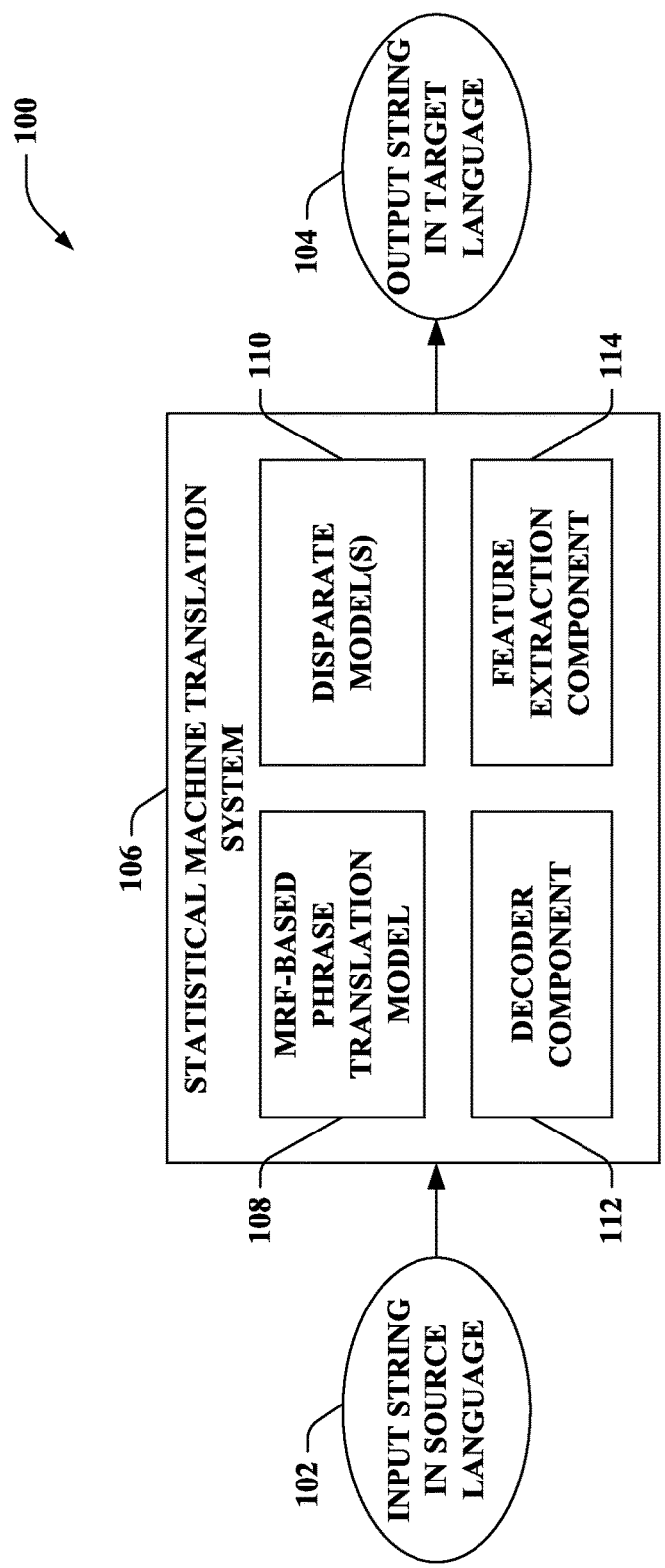
FIG. 1 illustrates a functional block diagram of an exemplary system that translates an input string in a source language to an output string in a target language.

Various technologies pertaining to training and utilizing Markov random field (MRF)-based translation models for statistic machine translation (SMT) systems are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

A general, statistical framework for modeling translation via Markov random fields (MRFs) is set forth herein. An MRF-based translation model can be utilized in a statistical machine translation (SMT) system. According to various embodiments, the MRF-based translation model can be for modeling phrase translation pairs (e.g., an MRF-based phrase translation model). While many of the examples set forth herein pertain to the MRF-based translation model being for modeling phrase translation pairs, it is contemplated that such examples can be extended to MRF-based translation models for other types of translation systems in addition to or instead of phrase translation systems (e.g., hierarchical phrase based translation systems, syntax-based translation systems, etc.).

The MRF-based phrase translation model allows for arbitrary features extracted from a phrase pair to be incorporated as evidence. The parameters of the model are estimated using a large-scale discriminative training approach based on stochastic gradient ascent and an N-best list based expected Bilingual Evaluation Understudy (BLEU) as an objective function. The model can be incorporated into a standard phrase-based SMT system with minimal or no change to code of a runtime engine of such SMT system. For instance, one or more scores generated using the MRF-based phrase translation model can be assigned to phrase pairs; such scores generated using the MRF-based phrase translation model can be assigned in addition to scores estimated by other techniques (e.g., conventional counting based techniques, using disparate model(s), etc.). Incorporation of the MRF-based phrase translation model into an SMT system can enhance performance of the SMT system (e.g., a gain of 0.8-1.3 BLEU points can be obtained as compared to conventional phrase based SMT systems).

Referring now to the drawings, FIG. 1 illustrates a system 100 that translates an input string 102 in a source language to an output string 104 in a target language. The system 100 includes a statistical machine translation (SMT) system 106 that receives the input string 102 in the source language and generates the output string 104 in the target language. It is contemplated that the source language and the target language differ from each other, but can be substantially any languages (e.g., the source language can be French and the target language can be English, etc.). Further, the input string 102 in the source language can be text, speech, and so forth. Similarly, the output string 104 in the target language can be text, speech, etc.

The SMT system 106 includes a Markov random field (MRF)-based phrase translation model 108. The MRF-based phrase translation model 108 can be used to score phrase translation pairs between the source language and the target language. For instance, the MRF-based phrase translation model 108 can be a phrase table. The MRF-based phrase translation model 108 can be employed to measure semantic similarity between phrases in the source language and the target language, for example. Further, it is to be appreciated that other types of MRF-based translation model(s) (e.g., other than the MRF-based phrase translation model 108) can additionally or alternatively fall within the scope of the hereto appended claims.

Moreover, the SMT system 106 can include substantially any number of disparate model(s) 110. Examples of the disparate model(s) 110 include one or more of a phrase translation model, a word translation model, a lexicalized reordering model, a word count model, a phrase count model, an n-gram language model, or the like. However, it is contemplated that the SMT system 106 need not include the disparate model(s) 110.

According to various embodiments, it is contemplated that the SMT system 106 can be a phrase-based SMT system. In accordance with such embodiments, the SMT system 106 can translate sequences of words (referred to as phrases), where the lengths of the phrases can differ. The phrases analyzed by the SMT system 106 can be phrasemes found using statistical methods from corpora as opposed to linguistic phrases. Many of the following examples pertain to the SMT system 106 being a phrase-based SMT system. Yet, in accordance with other embodiments, the SMT system 106 can be a disparate type of translation system such as, for instance, a hierarchical phrase based translation system, a syntax-based translation systems, or the like; accordingly, it is to be appreciated that the examples set forth herein can be extended to the SMT system 106 being a disparate type of translation system other than a phrase-based SMT system.

The SMT system 106 further includes a decoder component 112. The decoder component 112 can evaluate scores of phrase translation pair hypotheses between the source language and the target language utilizing the MRF-based phrase translation model 108 based upon a source phrase included in the input string 102 in the source language. Thus, the decoder component 112 can generate the output string 104 in the target language as a function of the scores of the phrase translation pair hypotheses. For example, the decoder component 112 can generate the output string 104 in the target language as a sum of scores of phrase translation pair hypotheses of source phrases that form the input string 102 in the source language. Following this example, a source-target string pair (e.g., input string 102—output string 104 pair) can include a list of source-target phrase pairs (e.g., a list of phrase translation pair hypotheses). The decoder component 112 can compute a translation score of a source-target string pair as a sum of the scores of the list of source-target phrase pairs that form the input string 102. Further, the decoder component 112 can use the MRF-based phrase translation model 108 to score the source-target phrase pairs.

According to an example where the SMT system 106 includes at least one disparate model 110, the decoder component 112 can generate the output string 104 in the target language utilizing the at least one disparate model (in addition to using the MRF-based phrase translation model 108). Pursuant to this example, the decoder component 112 can use a weighted log-linear combination of the MRF-based phrase translation model 108 and the at least one disparate model 110.

Moreover, the SMT system 106 can include a feature extraction component 114 that can extract features of the phrase translation pair hypotheses for the source phrase included in the input string 102 in the source language. The phrase translation pair hypotheses for the source phrase can include the source phrase included in the input string 102 in the source language and candidate target phrases in the target language. Accordingly, the decoder component 112 can evaluate the scores of the phrase translation pair hypotheses between the source language and the target language utilizing the MRF-based phrase translation model 108 based upon the features of the phrase translation pair hypotheses for the source phrase included in the input string 102 in the source language. According to various embodiments, the features of the phrase translation pair hypotheses for the source phrase can include phrase-pair features. According to other embodiments, the features of the phrase translation pair hypotheses for the source phrase can include word-pair features. Pursuant to other embodiments, the features of the phrase translation pair hypotheses for the source phrase can include phrase-pair features and word-pair features. In accordance with yet other embodiments, the features of the phrase translation pair hypotheses for the source phrase can include phrase-pair features, word-pair features, and triplet features. Such features are described below in greater detail.

The MRF-based phrase translation model 108 can provide a general, statistical framework for modeling phrase translations, where different features can be incorporated in a unified manner. Moreover, as presented in greater detail herein, parameters of the MRF-based phrase translation model 108 can be learned effectively using a large-scale discriminative training approach which is based on stochastic gradient ascent and an N-best list based expected BLEU as the objective function. While various exemplary features modeled by the MRF-based phrase translation model 108 are described herein, it is to be appreciated that disparate features that capture other translation dependencies are intended to fall within the scope of the hereto appended claims.

The translation from the input string 102 in the source language to the output string 104 in the target language performed by the SMT system 106 can be represented as a noisy-channel model. The noisy-channel model can be formulated as:

$$E^* = \operatorname*{argmax}_E P(E|F) = \operatorname*{argmax}_E P(E)P(F|E) \qquad (1)$$

In the foregoing, F is a source sentence and E is a target translation. The noisy-channel model can be formulated as identifying a particular translation E* from among possible translations E, given the source sentence F. The Bayes rule can enable inverting the conditioning of translation probability from the source sentence F to the target translation E.

The SMT system 106 (e.g., the decoder component 112) can use a weighted log-linear combination of several models h(F,E,A), namely, the MRF-based phrase translation model 108 and the disparate model(s) 110). Thus, the SMT system 106 can use the logarithm of the phrase probability (and the lexical weight) in source-to-target and target-to-source directions. The weighted log-linear combination of the MRF-based phrase translation model 108 and the disparate model(s) 110 is represented as:

$$E^* = \operatorname*{argmax}_E \sum_{m=1}^{M} \lambda_m h_m(F, E, A) \qquad (2)$$
$$= \operatorname*{argmax}_E \operatorname{Score}_\lambda(F, E)$$

As provided in Equation 2, A in h(F,E,A) is a hidden structure that best derives E from F, called the Viterbi derivation herein. In phrase-based SMT, A includes (1) the segmentation of the source sentence into phrases, (2) the segmentation of the target sentence into phrases, and (3) an alignment between the source and target phrases. Moreover, M is the number of models (e.g., the MRF-based phrase translation model 108 and the disparate model(s) 110) used by the SMT system 106, m is an index for the models, and $\lambda_m$ is a respective weight for each of the models. For instance, the weights can correspond to reliability of the models. Accordingly, the MRF-based phrase translation model 108 described herein can be integrated into the weighted log-linear combination of models used by the SMT system 106.

MRFs, also known as undirected graphical models, are often used in modeling joint distributions of spatial or contextual dependencies of physical phenomena. As provided herein, MRFs can be used to model a joint distribution $P_w(f,e)$ over a source-target translation phrase pair (f,e), parameterized by w. The MRF-based phrase translation model 108 is different from directional translation models that are based on conditional probabilities. The MRF model $P_w(f,e)$ can be utilized in the log-linear framework noted above since agreement or compatibility of a phrase pair can enhance score translation quality more than a directional translation probability which is modeled based on an imaged generative story.

A Markov random field is constructed from a graph G. Nodes of the graph represent random variables, and edges define independence semantics between the random variables. An MRF satisfies the Markov property, which states that a node is independent of all of its non-neighbors, defined by clique configurations of G. In modeling a phrase translation pair, two types of nodes can be defined: (1) phrase nodes and (2) word nodes. More particularly, the graph G can include two phrase nodes and a set of word nodes, each for a word in the two phrases.

Figure 2:
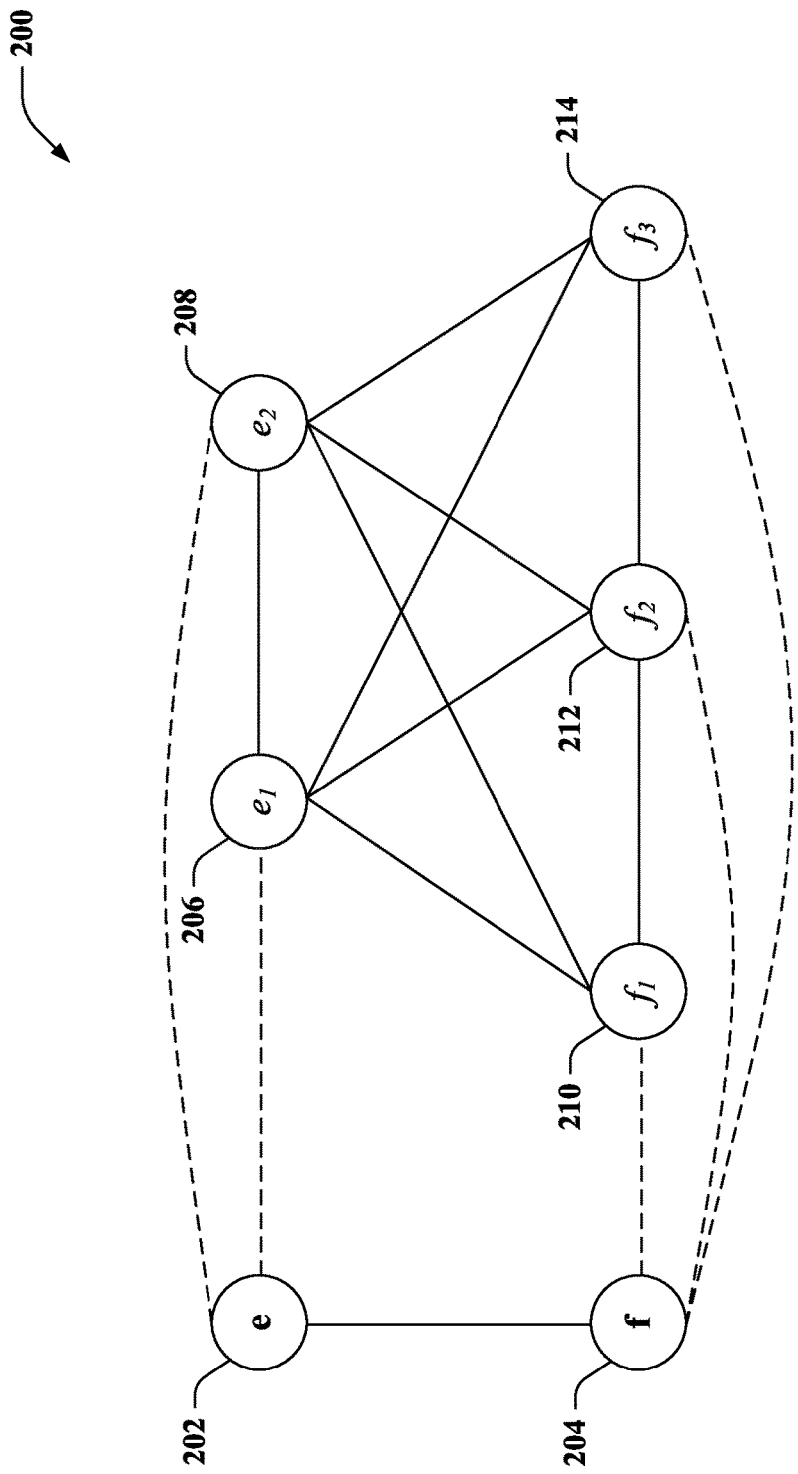
FIG. 2 illustrates an exemplary graph of a Markov random field model for phrase translation.

FIG. 2 depicts an exemplary graph 200 (e.g., a graph G). A phrase node 202 represents a target phrase (e.g., in the target language) and a phrase node 204 represents a source phrase (e.g., in the source language). In the example depicted in FIG. 2, the target phrase includes two words and the source phrase includes three words. Accordingly, the graph 200 includes a word node 206 and a word node 208 that respectively represent the two words of the target phrase. Moreover, the graph 200 includes a word node 210, a word node 212, and a word node 214 that respectively represent the three words of the source phrase.

Moreover, the joint distribution over the random variables in G can be defined as:

$$P_w(f, e) = \frac{1}{Z} \prod_{c \in C(G)} \varphi(c; w) \qquad (3)$$

where $e=e_1, \ldots, e_{|e|}$, $f=f_1, \ldots, f_{|f|}$, and C(G) is a set of cliques in G. Further, each $\varphi(c; w)$ is a non-negative potential function defined over a clique configuration c that measures a compatibility of the configuration, and w is a set of parameters that are used within the potential function. Z in Equation (3), which can be referred to as a partition function, is a normalization constant and is given by:

$$Z = \sum_f \sum_e \prod_{c \in C(G)} \varphi(c; w) \quad (4)$$
$$= \sum_f \sum_e \text{Score}(f, e)$$

Z can normalize the distribution $P_w(f,e)$ given by Equation (3). However, it may not be feasible to compute Z due to the exponential number of terms in the summation. Yet, Z is a global constant which is independent of e and f. Therefore, when ranking phrase translation pair hypotheses, as performed by the decoder component 112 in the SMT system 106 of FIG. 1, Z can be dropped; thus, each phrase translation pair hypothesis can be ranked by its unnormalized joint probability (e.g., by the decoder component 112). Accordingly, an unnormalized probability (e.g., Score(f,e) as defined in Equation (4)) can be stored in a phrase table for each translation pair (f,e).

It is common to define MRF potential functions of the exponential form as $\varphi(c; w)=\exp(w_c \phi(c))$, where $\phi(c)$ is a real-valued feature function over clique c and $w_c$ is the weight of the feature function. In phrase-based SMT systems, the sentence-level translation probability from F to E is decomposed as the product of a set of phrase translation probabilities. Dropping the phrase segmentation and distortion model components leads to the following, where A is the Viterbi derivation:

$$P(E|F) \approx \max_A P(E|A, F) \quad (5)$$
$$P(E|A, F) = \prod_{(f,e) \in A} P(e|f)$$

Similarly, the joint probability P(F|E) can be decomposed as:

$$P(F, E) \approx \max_A P(F, A, E) \quad (6)$$
$$P(F, A, E) = \prod_{(f,e) \in A} P_w(f, e)$$
$$\propto \sum_{(f,e) \in A} \log P_w(f, e)$$
$$= \sum_{(f,e) \in A} \sum_{c \in G_{f,e}(c)} w_c \phi(c)$$
$$= \sum_{(f,e) \in A} w \cdot \phi(f, e)$$

which can essentially be proportional to a weighted linear combination of a set of features.

To instantiate an MRF model, a graph structure representing the translation dependencies between source and target phrases, and a set of potential functions over the cliques of this graph can be defined.

As noted above, the exemplary graph 200 (e.g., the graph G) of FIG. 2 includes two types of nodes: phrase nodes 202-204 and word nodes 206-214. The MRF-based phrase translation model 108 described herein can be constructed from the graph 200. The graph 200 includes two phrase nodes 202-204 for the source and target phrases respectively and word nodes 206-214, each for a word in these phrases. Cliques and their corresponding potential functions (or features) attempt to abstract the idea behind translation models that can be effective for machine translation. In particular, three types of cliques can be formed from the graph G (e.g., the graph 200).

A first type of clique includes two phrase nodes. Thus, from the graph 200, a clique that includes the phrase node 202 and the phrase node 204 can be formed. A potential function over such a clique captures phrase-to-phrase translation dependencies similar to the use the bi-directional translation models in phrase-based SMT systems. The potential is defined as $\varphi_p(f,e)=w_p \phi_p(f,e)$, where the feature $\phi_p(f,e)$, called the phrase-pair feature, is an indicator function whose value is 1 if e is target phrase and f is source phrase, and 0 otherwise. While the conditional probabilities in a directional translation model is estimated using relative frequencies of phrase pairs extracted from word-aligned parallel sentences, the parameter of the phrase-pair function $w_p$ can be learned discriminatively as described in greater detail below.

A second type of clique includes two word nodes, one in the source phrase and the other in the target phrase. An example of such a clique formed from the graph 200 includes the word node 206 and the word node 210. A potential over such a clique captures word-to-word translation dependencies similar to the use the IBM Model 1 for lexical weighting in phrase-based SMT systems. The potential function is defined as $\varphi_t(f,e)=w_t \phi_t(f,e)$, where the feature $\phi_t(f,e)$, called the word-pair feature, is an indicator function whose value is 1 if e is a word in target phrase e and f is a word in source phrase f, and 0 otherwise.

A third type of cliques includes three word nodes, with two of the word nodes being in one language and the third word node being in the other language. An example of such a clique formed from the graph 200 includes the word node 206, the word node 210, and the word node 212. A potential over such a clique is intended to capture inter-word dependencies for selecting word translations. The potential function can be based on the triplet lexicon model which is based on lexicalized triplets (e,f,f'). It can be understood as two source (or target) words triggering one target (or source) word. The potential function is defined as $\varphi_{tp}(f,f',e)=w_{tp} \phi_{tp}(f,f',e)$, where the feature $\phi_{tp}(f,f',e)$, called the triplet feature, is an indicator function whose value is 1 if e is a word in target phrase e and f and f' are two different words in source phrase f, and 0 otherwise.

Moreover, for any clique c that includes nodes in only one language, it can be assumed that $\varphi(c)=1$ for such clique, which typically has no impact on scoring a phrase pair. According to an example, a potential over cliques including a phrase node and word nodes in target language can be defined, which can act as a form of a target language model. By way of another example, edges can be added in the graph so as to define potentials that capture more sophisticated translation dependencies. The optimal potential set can vary among different language pairs and depend upon an amount and quality of training data.

Figure 3:
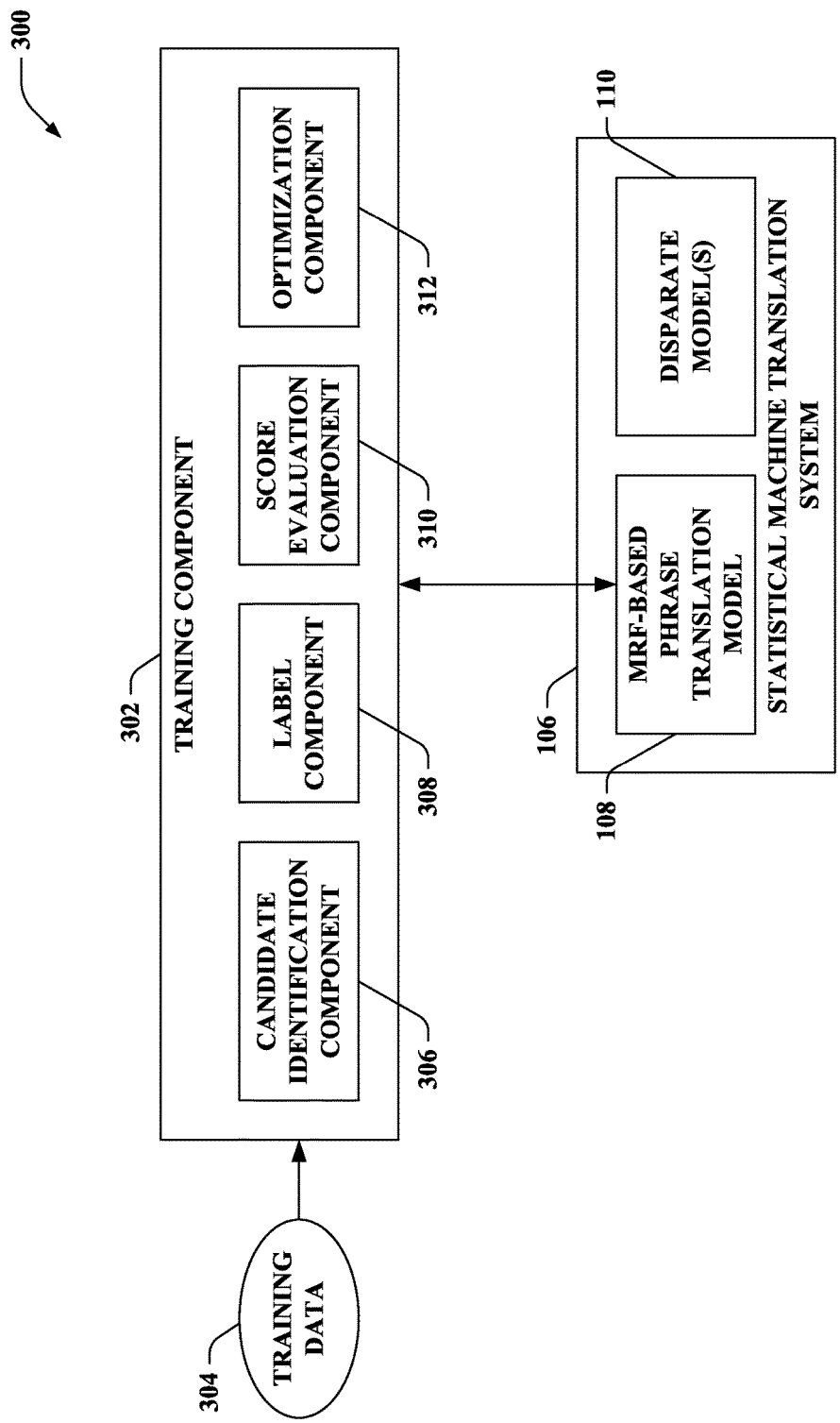
FIG. 3 illustrates a functional block diagram of an exemplary system that creates an MRF-based phrase translation model.

Turning to FIG. 3, illustrated is a system 300 that creates the MRF-based phrase translation model 108. The system 300 includes a training component 302 that trains the MRF-based phrase translation model 108 based upon training data 304. The training component 302 can learn parameters of the MRF-based phrase translation model 108 from the training data 304 using a large-scale discriminative training algorithm based on stochastic gradient ascent and an objective function for parameter optimization.

Similar to techniques for constructing conventional phrase tables, the training component 302 can construct the MRF-based phrase translation model 108 by heuristically extracting bilingual phrase pairs from automatically word-aligned training data (e.g., the training data 304). Thereafter, the training component 302 can perform parameter estimation. Yet, techniques for parameter estimation described herein differ from conventional approaches.

Moreover, instead of parameterizing a phrase translation pair using a set of scoring functions that are learned independently (e.g., phrase translation probabilities and lexical weights), the training component 302 can use a general, statistical framework in which arbitrary features extracted from a phrase pair can be incorporated to model the translation in a unified way. Utilization of the MRF-based phrase translation model 108 can provide such general, statistical framework.

Further, because the MRF-based phrase translation model 108 has to work with other component models (e.g., the disparate model(s) 110) in the SMT system 106 in order to produce translations, and the quality of translation is measured via BLEU score, it is desirable to optimize the parameters of the MRF-based phrase translation model 108 jointly with the other component models with respect to an objective function that is closely related to the evaluation metric under consideration (e.g., BLEU). To this end, a large-scale discriminative training approach can be implemented by the training component 302. While techniques such as Minimum Error Rate Training (MERT) can be used for tuning a small number of features on a small training set, discriminative training methods as provided herein can support training for a greater number of features for a greater number of sentence pairs. More particularly, the training component 302 can use stochastic gradient ascent and an N-best list based expected BLEU as the objective function for large-scale discriminative training.

Moreover, training of the MRF-based phrase translation model 108 can be adopted for various SMT systems, and the learning techniques can provide results that are reproducible. The features for the MRF-based phrase translation model 108 can be developed in such a way that the resulting model is of the same or similar format as that of a traditional phrase table. Thus, the MRF-based phrase translation model 108 can be incorporated into a standard phrase-based SMT system, requiring minimal or no code change in the runtime engine. Yet, it is to be appreciated that other formats are intended to fall within the scope of the hereto appended claims.

Estimation of the parameters of the MRF-based phrase translation model 108 by the training component 302 is now described. It is to be appreciated, however, that parameters other than those described below can additionally or alternatively be estimated by the training component 302.

Although MRFs are by nature generative models, it may be inappropriate to train the parameters using conventional likelihood based approaches for various reasons. For instance, it may be difficult to compute the partition function in Equation (4), especially depending upon scale. Further, use of conventional likelihood based approaches can be inappropriate due to the metric divergence problem. That is, the maximum likelihood estimation is unlikely to be optimal for the evaluation metric under consideration, as demonstrated on a variety of tasks including machine translation and information retrieval. Therefore, a large-scale discriminative training approach that uses stochastic gradient ascent and an N-best list based expected BLEU as the objective function can instead be utilized by the training component 302.

Machine translation can be cast as a structured classification task. It maps an input source sentence F to an output pair (E,A) where E is the output target sentence and A the Viterbi derivation of E. A is assumed to be constructed during the translation process. In phrase-based SMT, A includes a segmentation of the source and target sentences into phrases and an alignment between source and target phrases.

It can be assumed that translations are modeled using a linear model parameterized by a vector θ. Given a vector h(F,E,A) of feature functions on (F,E,A), and assuming θ contains a component for each feature, the output pair (E,A) for a given input F are selected using the argmax decision rule:

$$(E^*, A^*) = \underset{(E,A)}{\operatorname{argmax}} \theta^T h(F, E, A) \tag{7}$$

In phrase-based SMT, computing the argmax exactly is intractable, so it is performed approximately by beam decoding.

In a phrase-based SMT system (e.g., the SMT system 106) equipped by a MRF-based phrase translation model (e.g., the MRF-based phrase translation model 108), the parameters to be learned by the training component 302 are $\theta=(\lambda,w)$, where $\lambda$ is a vector of parameters (e.g., on the order of ones or tens of parameters) used in the log-linear model of Equation (2), with one weight for each component model (e.g., a respective weight for each of the MRF-based phrase translation model 108 and the disparate model(s) 110); and w is a vector including weights (e.g., on the order of millions of weights), each for one feature function in the MRF model of Equation (3).

The training component 302 can include a candidate identification component 306, a label component 308, a score evaluation component 308, and an optimization component 312 for learning θ (e.g., employing three steps). More particularly, given a baseline phrase-based SMT system (e.g., the SMT system 106 of FIG. 1) and a pre-set λ, the candidate identification component 306 can generate an N-best list of translation hypotheses for each source sentence in the training data 304. Thereafter, with λ fixed, the optimization component 312 can optimize w with respect to an objective function on the training data 304. Then, with w fixed, the optimization component 312 can optimize λ using MERT to maximize the BLEU score on development data.

The candidate identification component 306 can generate respective N-best lists of translation hypotheses for the source sentences in the training data 304. Given a set of source-target sentence pairs as training data $(F_n, E_n^r)$, n=1 . . . N, a baseline phrase-based SMT system (e.g., the SMT system 106 with the disparate model(s) 110 and/or a previously trained MRF-based phrase translation model) can be used by the candidate identification component 306 to generate a list of N-best output pairs (e.g., 100-best output pairs) for each source sentence F according to Equation (7).

Moreover, the label component 308 can compute objective function scores for the translation hypotheses. The label component 308 can label the translation hypotheses with the respective objective function scores. Thus, the label component 308 can label each output pair (E,A) by a sentence-level BLEU score, denoted by sBLEU, which is computed according to Equation (8):

$$sBLEU(E, E^r) = BP \times \frac{1}{4}\sum_{n=1}^{4} \log p_n \quad (8)$$

In the foregoing, $E^r$ is the reference translation (e.g., human provided translation, translation considered to be true, etc.), and $p_n$, n=1 ... 4 are precisions of n-grams. While precisions of lower order n-grams (e.g., $p_1$ and $p_2$) are computed by the label component 308 directly without smoothing, matching counts for higher order n-grams can be sparse at the sentence level and can thus be smoothed by the label component 308 as:

$$p_n = \frac{\#(matched\ ngram) + \alpha p_n^0}{\#(ngram) + \alpha}, \text{ for } n = 3, 4$$

In the above, $\alpha$ is a smoothing parameter (e.g., set to 5), and $p_n^0$ is the prior value of $p_n$, whose value is computed as $p_n^0 = (p_{n-1})^2/p_{n-2}$ for n=3 and 4. BP in Equation (8) is the sentence-level brevity penalty, computed as $$BP = \exp\left(1 - \beta\frac{r}{c}\right),$$

which differs from its corpus-level counterpart in two ways. First, a non-clipped BP can be used, which can provide an enhanced approximation to the corpus-level BLEU computation because the per-sentence BP may effectively exceed unity in corpus-level BLEU computation. Second, the ratio between the length of reference sentence r and the length of translation hypothesis c is scaled by a factor $\beta$ such that the total length of the references on training data equals that of the 1-best translation hypotheses produced by the baseline SMT system.

Utilization of sBLEU defined above can provide a small but consistent improvement over other variations of sentence-level BLEU. The use of the scaling factor $\beta$ in computing BP can enhance BP of the baseline's 1-best output on the training data 304, and can provide an effect of forcing the discriminative training to improve BLEU by improving n-gram precisions rather than by improving brevity penalty.

Moreover, the score evaluation component 310 can compute respective translation scores for the translation hypotheses using current parameters of the MRF-based phrase translation model 108. Further, the optimization component 312 can update the parameters of the MRF-based phrase translation model 108 utilizing stochastic gradient ascent based on the objective function scores and the translation scores for the translation hypotheses.

The optimization component 312 can use an N-best list based expected BLEU as the objective function for parameter optimization. Given the current model $\theta$, the expected BLEU, denoted by xBLEU($\theta$), over one training sample (e.g., a labeled N-best list generated from a pair of source and target sentences (F,E')), can be defined as:

$$xBLEU(\theta) = \sum_E P_\theta(E|F) sBLEU(E, E^r) \quad (9)$$

where sBLEU is the sentence-level BLEU, defined in Equation (8). Moreover, $P_\theta(E|F)$ is a normalized translation probability from F to E computed by the score evaluation component 310 using softmax as:

$$P_\theta(E|F) = \frac{\exp(Score_\theta(F, E))}{\sum_{E'} \exp(Score_\theta(F, E'))} \quad (10)$$

where $Score_\theta(.)$ is the translation score according to the current model $\theta$:

$$Score_\theta(F, E) = \lambda \cdot h(F, E, A) + \sum_{(f,e) \in A} w \cdot \phi(f, e) \quad (11)$$

The right hand side of Equation (11) includes two terms. The first term is the score produced by the baseline system, which is fixed during phrase model training. The second term is the translation score produced by the MRF model, which is updated after each training sample during training Comparing Equations (2) and (11), the MRF model can be viewed as yet another component model under the log linear model framework with its $\lambda$ being set to 1.

Given the objective function, the parameters of the MRF model are optimized by the optimization component 312 using stochastic gradient ascent. The following algorithm, for instance, can be employed by the training component 302 to train the MRF-based phrase translation model 108.
1) Initialize w, assuming $\lambda$ is fixed during training.
2) For t=1 ... T (T=the total number of iterations)
3) For each training sample (labeled 100-best list)
4) Compute $P_\theta(E|F)$ for each translation hypothesis E based on the current model $\theta=(\lambda,w)$
5) Update the model via $w^{new}=w^{old}+\eta \cdot g(w^{old})$, where $\eta$ is the learning rate and g is the gradient computed according to Equations 12 and 13 below.

Accordingly, as shown above, T iterations can be performed on the training set, where each time is considered an epoch. For each training sample, the model parameters can be updated as:

$$w^{new}=w^{old}+\eta \cdot g(w^{old}) \quad (12)$$

where $\eta$ is the learning rate. The gradient g is computed as:

$$g(w) = \frac{\partial xBLEU(w)}{\partial w} \quad (13)$$

$$= \sum_{(E,A)} (sBLEU(E, E^r) - xBLEU(\theta))$$

$$P_\theta(E|F)\phi(F, E, A)$$

The foregoing algorithm can be employed to simplify the training procedure without scarifying much quality of the trained model. For instance, a regularization term is not included in the objective function; rather, early stopping and cross valuation can be implemented. According to an example, it is contemplated that an MRF model can be produced after each epoch, and quality on a development set can be tested by first combining the MRF model with other baseline component models via MERT and then examining BLEU score on the development set. By way of illustration, training for T epochs (T=100) can be performed and then the model with the best BLEU score on the development set can be selected; yet, the claimed subject matter is not limited to the foregoing example. Moreover, it is contemplated that the leave-one-out method to generate the N-best lists need not be employed. Instead, the models used in the baseline SMT system can be trained on the same parallel data on which the N-best lists are generated.

Many of the examples set forth herein describe an offline training algorithm. Yet, it is contemplated that the techniques set forth herein can be applicable to other scenarios, such as online adaptation (e.g., as described in FIG. 4).

Figure 4:
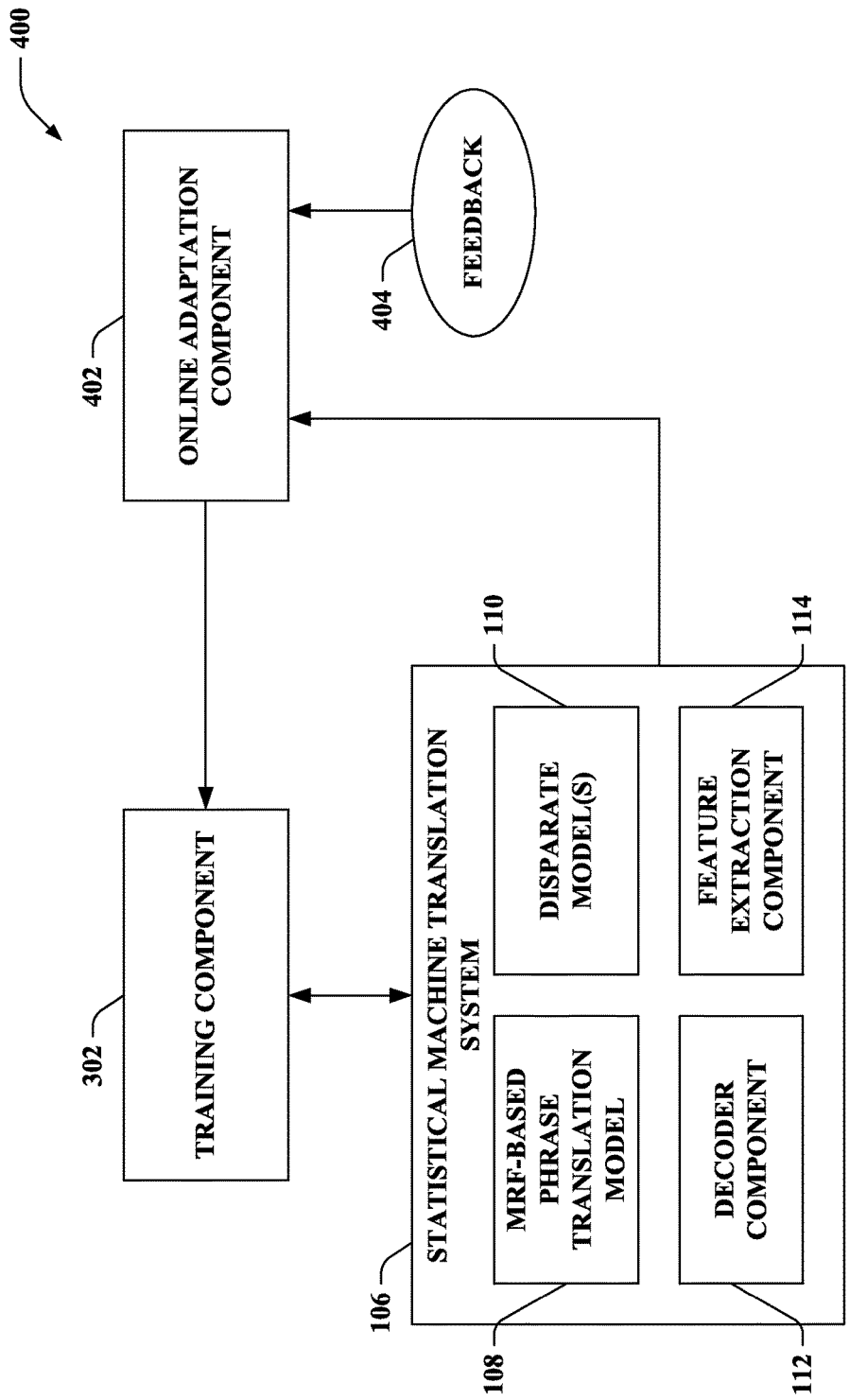
FIG. 4 illustrates a functional block diagram of an exemplary system that updates an MRF-based phrase translation model over time.

FIG. 4 illustrates a system 400 that updates the MRF-based phrase translation model 108 over time. The system 400 includes the SMT system 106, which can further include the MRF-based phrase translation model 108, the disparate model(s) 110, the decoder component 112, and the feature extraction component 114. Moreover, the system 400 includes the training component 302; although not show, it is contemplated that the training component 302 can include the candidate identification component 306, the label component 308, the score evaluation component 310, and the optimization component 312.

The system 400 further includes an online adaptation component 402 that receives feedback 404 pertaining to an output string (e.g., the output string 104) in the target language generated by the SMT system 106. Further, the online adaptation component 402 can update the MRF-based phrase translation model 108 responsive to the feedback 404 (e.g., utilizing the training component 302). The feedback 404, for instance, can be a modified translation of an input string (e.g., the input string 102) in the source language relative to the output string, where the modified translation is in the target language. Moreover, the online adaptation component 402 can utilize the modified translation as a positive example and the output string as a negative example to update the MRF-based phrase translation model 108. According to various embodiments, the training component 302 can include the online adaptation component 402; yet, the claimed subject matter is not so limited.

For example, for online adaptation, the SMT system 106 can translate a sentence and output a translation (e.g., the output string 104 in the target language) to a user. The user can provide the feedback 404 pertaining to the translation (e.g., make changes to the translation). Accordingly, the originally provided translation can be used as a negative example while the user provided feedback 404 can be used as a positive example, which can be utilized by the training component 302 to update the MRF-based phrase translation model 108. Thus, online adaptation can cause the MRF-based phrase translation model 108 to be updated based upon user provided feedback (or feedback from substantially any other source).

In general, conventional approaches for learning phrase translation probabilities often are based on counting of words or phrases on word-aligned training data. Some other traditional techniques go beyond pure counting of phrases on word-aligned corpora to attempt to learn phrase translation probabilities. As an example, some techniques find phrase alignment directly on training data and update the translation probabilities based on this alignment. Other conventional exemplary techniques learn phrase translation probabilities discriminatively by using multiple stages; however, such techniques may be difficult to implement. In contrast to these conventional approaches, the techniques set forth herein use of an MRF model. Further, as provided herein, stochastic gradient ascent based training for an MRF model can be implemented.

Moreover, conventional approaches that employ discriminative training for SMT often use either a handful of features or small training sets of a few thousand sentences. Another undirected graphical model that has traditionally been used for natural language processing (NLP) is a conditional random field (CRF). An MRF differs from a CRF in that its partition function is no longer observation dependent. As a result, learning an MRF can be more difficult than learning a CRF using maximum likelihood estimation. The foregoing can be mitigated utilizing an alternative learning approach for MRF, namely, discriminative training as set forth herein.

FIGS. 5-8 illustrate exemplary methodologies relating to training and utilizing an MRF-based phrase translation model. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Figure 5:
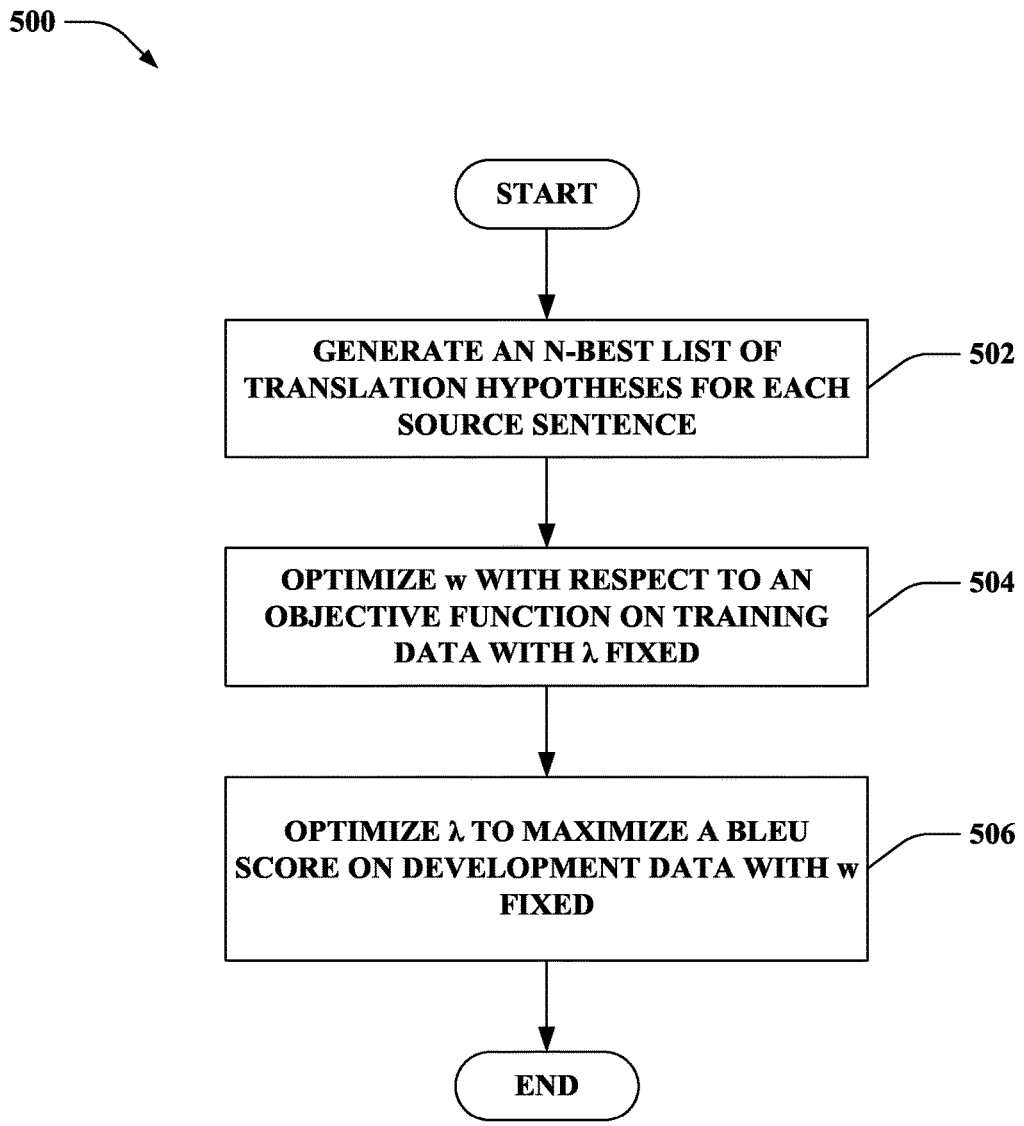
FIG. 5 is a flow diagram that illustrates an exemplary methodology of training an MRF-based phrase translation model.

FIG. 5 illustrates a methodology 500 of training an MRF-based phrase translation model. A baseline phrase-based SMT system can be provided and λ can be pre-set. At 502, an N-best list of translation hypotheses for each source sentence in training data can be generated. The N-best list of hypotheses can be scored based upon a comparison to a reference translation for each source sentence. At 504, w can be optimized with respect to an objective function on training data with λ fixed. At 506, λ can be optimized to maximize a BLEU score on development data with w fixed.

Figure 6:
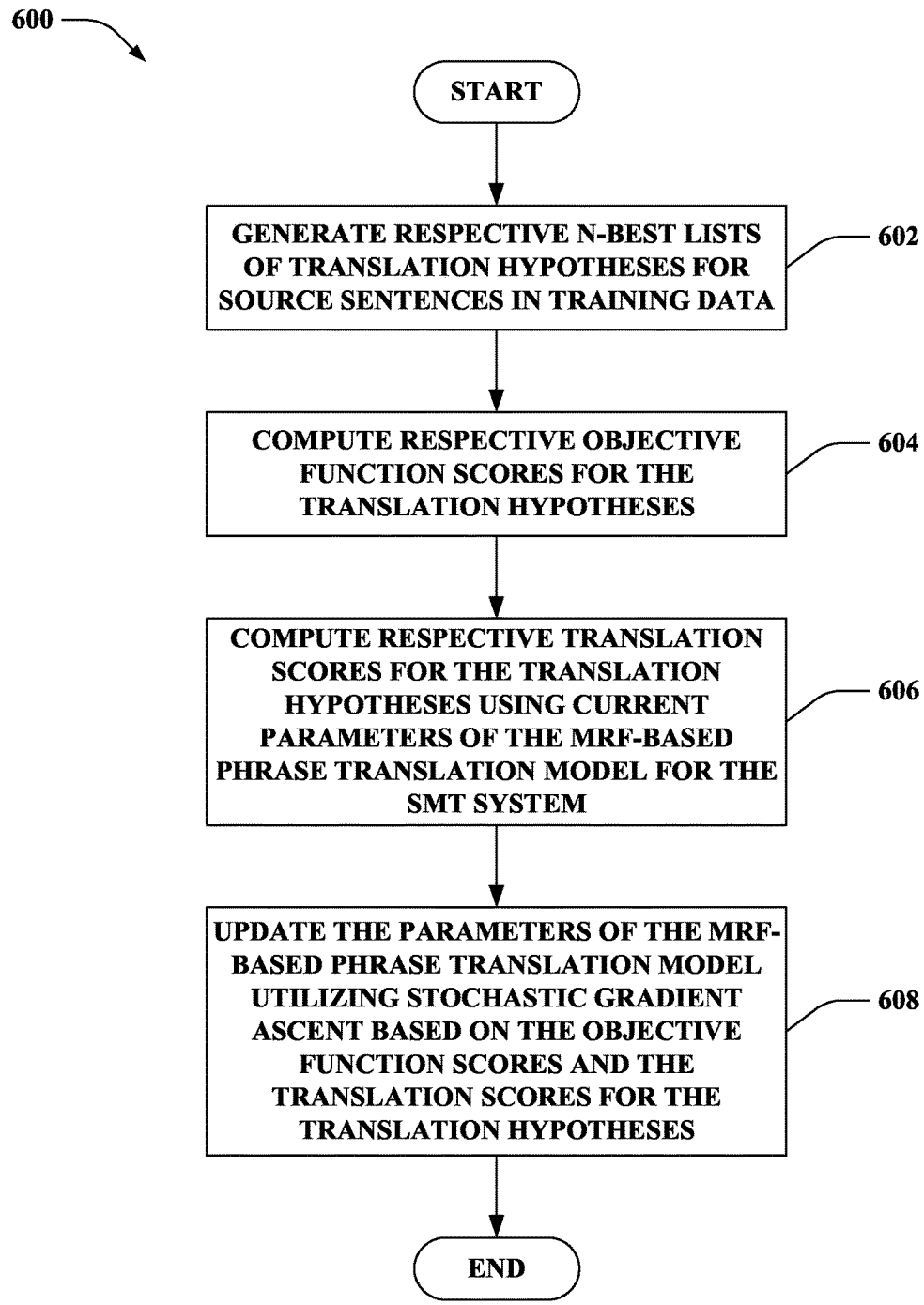
FIG. 6 is a flow diagram that illustrates an exemplary methodology of training an MRF-based phrase translation model for an SMT system.

Turning to FIG. 6, illustrated is a methodology 600 of training an MRF-based phrase translation model for an SMT system. At 602, respective N-best lists of translation hypotheses can be generated for source sentences in training data. At 604, respective objective function scores can be computed for the translation hypotheses. The objective function scores, for instance, can be expected BLEU scores. At 606, respective translation scores can be computed for the translation hypotheses using current parameters of the MRF-based phrase translation model for the SMT system. At 608, the parameters of the MRF-based phrase translation model can be updated utilizing stochastic gradient ascent based on the objective function scores and the translation scores for the translation hypotheses. According to an example, respective weights for the MRF-based phrase translation model and at least one disparate model can be optimized for the SMT system.

Figure 7:
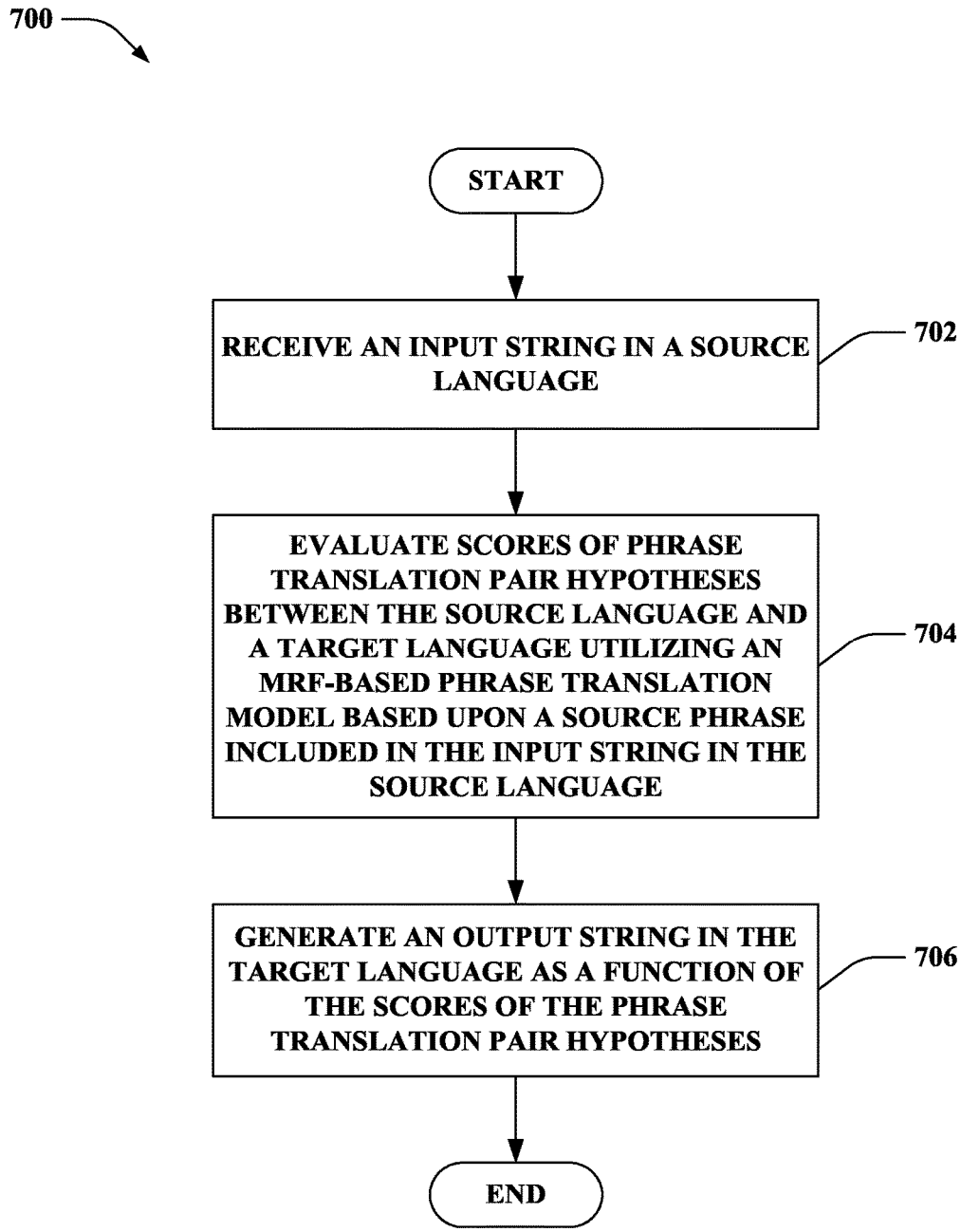
FIG. 7 is a flow diagram that illustrates an exemplary methodology of translating an input string in a source language to an output string in a target language.

With reference to FIG. 7, illustrated is a methodology 700 of translating an input string in a source language to an output string in a target language. At 702, the input string in the source language can be received. The input string, for instance, can be received at an SMT system. At 704, scores of phrase translation pair hypotheses between the source language and the target language can be evaluated utilizing an MRF-based phrase translation model based upon a source phrase included in the input string in the source language. At 706, the output string in the target language can be generated as a function of the scores of the phrase translation pair hypotheses. For instance, the input string can include a set of source phrases. Scores of phrases translation pair hypotheses for each of the source phrases in the set can be summed. Further, the output string in the target language can be generated based upon the sum of the scores of the phrase translation pair hypotheses of the source phrases in the set, where the set of source phrases forms the input string.

Figure 8:
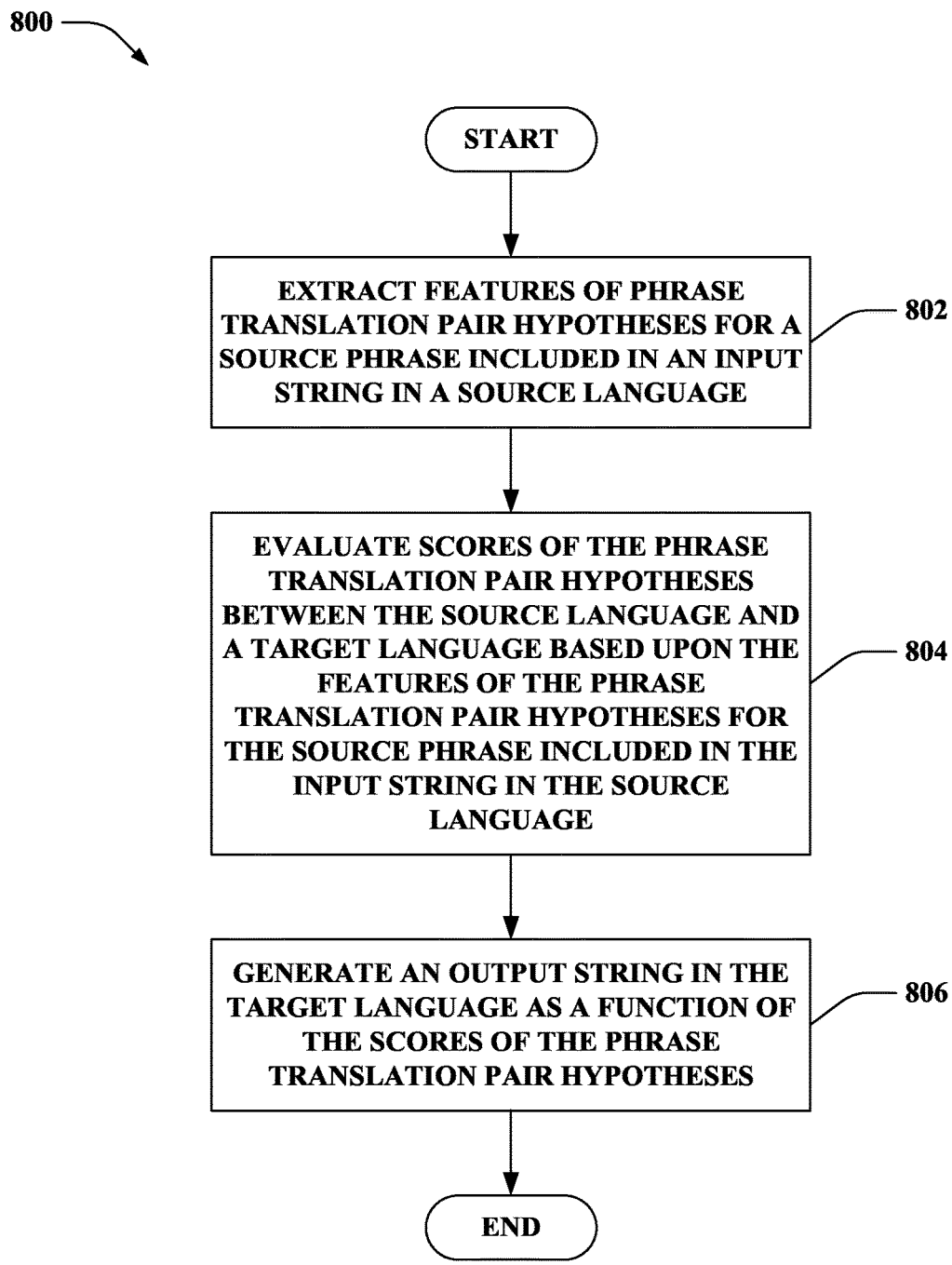
FIG. 8 is a flow diagram that illustrates an exemplary methodology of translating an input string in a source language to an output string in a target language.

Now referring to FIG. 8, illustrated is a methodology 800 of translating an input string in a source language to an output string in a target language. At 802, features of phrase translation pair hypotheses for a source phrase included in the input string in the source language can be extracted. The phrase translation pair hypotheses for the source phrase can include the source phrase included in the input string in the source language and candidate target phrases in the target language. The features of the phrase translation pair hypotheses for the source phrase can include phrase-pair features, word-pair features, and triplet features. At 804, scores of the phrase translation pair hypotheses between the source language and the target language can be evaluated based upon the features of the phrase translation pair hypotheses for the source phrase included in the input string in the source language. At 806, the output string in the target language can be generated as a function of the scores of the phrase translation pair hypotheses.

Figure 9:
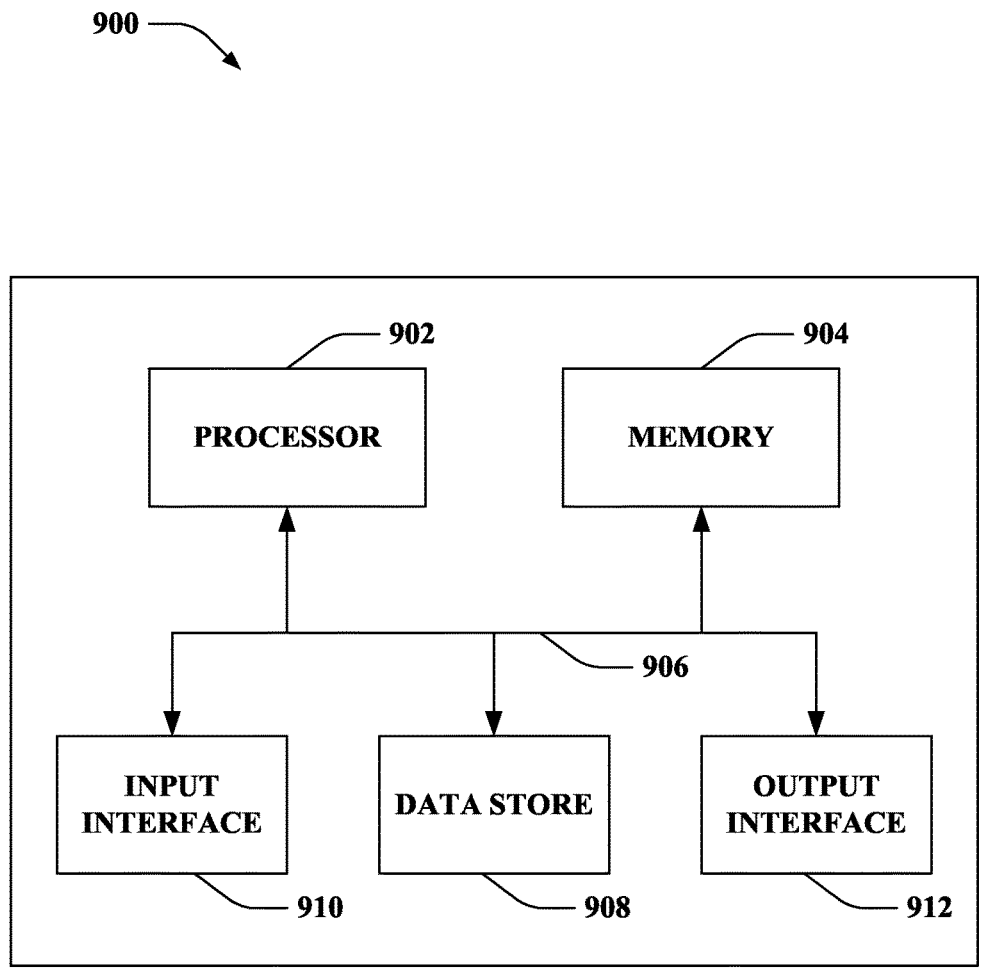
FIG. 9 illustrates an exemplary computing device.

Referring now to FIG. 9, a high-level illustration of an exemplary computing device 900 that can be used in accordance with the systems and methodologies disclosed herein is illustrated. For instance, the computing device 900 may be used in a system that utilizes an MRF-based phrase translation model. By way of another example, the computing device 900 may be used in a system that trains an MRF-based phrase translation model. The computing device 900 includes at least one processor 902 that executes instructions that are stored in a memory 904. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store training data, models, and so forth.

The computing device 900 additionally includes a data store 908 that is accessible by the processor 902 by way of the system bus 906. The data store 908 may include executable instructions, training data, models, etc. The computing device 900 also includes an input interface 910 that allows external devices to communicate with the computing device 900. For instance, the input interface 910 may be used to receive instructions from an external computer device, from a user, etc. The computing device 900 also includes an output interface 912 that interfaces the computing device 900 with one or more external devices. For example, the computing device 900 may display text, images, etc. by way of the output interface 912.

It is contemplated that the external devices that communicate with the computing device 900 via the input interface 910 and the output interface 912 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 900 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 900 may be a distributed system. Thus, for instance, several devices may be in communication by way of a network connection and may collectively perform tasks described as being performed by the computing device 900.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDss), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing system that translates an input string in a source language to an output string in a target language, comprising:
   at least one processor; and
   memory that comprises computer-executable instructions that, when executed by the at least one processor, cause the at least one processor to perform acts including:
      receiving the input string in the source language; and
      generating, utilizing a statistical machine translation (SMT) system, the output string in the target language based upon the input string in the source language, wherein the SMT system comprises:
         a Markov random field (MRF)-based phrase translation model, the MRF-based phrase translation model specifies semantic similarity between phrases in the source language and the target language;
         at least one disparate model other than the MIRE-based phrase translation model; and
         a decoder configured to:
            evaluate scores of phrase translation pair hypotheses between the source language and the target language utilizing the MRF-based phrase translation model based upon a source phrase included in the input string in the source language;
            evaluate disparate scores utilizing the at least one disparate model based on the input string in the source language; and
            generate the output string in the target language as a function of the scores of the phrase translation pair hypotheses and the disparate scores.

2. The computing system of claim 1, wherein:
   the SMT system is further configured to extract features of the phrase translation pair hypotheses for the source phrase, wherein the phrase translation pair hypotheses for the source phrase comprise the source phrase included in the input string in the source language and candidate target phrases in the target language; and
   the decoder is further configured to evaluate the scores of the phrase translation pair hypotheses between the source language and the target language utilizing the MRF-based phrase translation model based upon the features of the phrase translation pair hypotheses for the source phrase.

3. The computing system of claim 2, wherein the features of the phrase translation pair hypotheses for the source phrase comprise phrase-pair features.

4. The computing system of claim 2, wherein the features of the phrase translation pair hypotheses for the source phrase comprise word-pair features.

5. The computing system of claim 2, wherein the features of the phrase translation pair hypotheses for the source phrase comprise phrase-pair features and word-pair features.

6. The computing system of claim 2, wherein the features of the phrase translation pair hypotheses for the source phrase comprise phrase-pair features, word-pair features, and triplet features.

7. The computing system of claim 1, wherein the decoder is further configured to:
   use a weighted log-linear combination of the MRF-based phrase translation model and the at least one disparate model.

8. The computing system of claim 1, wherein the at least one disparate model comprises one or more of a phrase translation model, a word translation model, a lexicalized reordering model, a word count model, a phrase count model, or an n-gram language model.

9. The computing system of claim 1, the memory further comprising computer-executable instructions that, when executed by the at least one processor, cause the at least one processor to perform acts including:
   receiving feedback pertaining to the output string in the target language generated by the SMT system; and
   updating the MRF-based phrase translation model responsive to the feedback.

10. The computing system of claim 9, wherein the feedback comprises a modified translation of the input string relative to the output string, the modified translation being in the target language, and wherein the modified translation is utilized as a positive example and the output string is utilized as a negative example to update the MRF-based phrase translation model.

11. The computing system of claim 1, the memory further comprising computer-executable instructions that, when executed by the at least one processor, cause the at least one processor to perform acts including:
   learning parameters of the MRF-based phrase translation model from training data using a large-scale discriminative training algorithm based on stochastic gradient ascent and an objective function for parameter optimization.

12. The computing system of claim 11, the memory further comprising computer-executable instructions that, when executed by the at least one processor, cause the at least one processor to perform acts including:
   generating respective N-best lists of translation hypotheses for source sentences in the training data;
   computing respective objective function scores for the translation hypotheses;
   computing respective translation scores for the translation hypotheses using current parameters of the MRF-based phrase translation model; and
   updating the parameters of the MRF-based phrase translation model utilizing stochastic gradient ascent based on the objective function scores and the translation scores for the translation hypotheses.

13. A method of training a Markov random field (MRF)-based phrase translation model for a statistical machine translation (SMT) system, comprising:
   generating respective N-best lists of translation hypotheses for source sentences in training data;
   computing respective objective function scores for the translation hypotheses;

computing respective translation scores for the translation hypotheses using current parameters of the MRF-based phrase translation model for the SMT system, the MRF-based phrase translation model specifies semantic similarity between phrases in a source language and a target language, the MRF-based phrase translation model and at least one disparate model other than the MRF-based phrase translation model being combined in the SMT system; and updating the parameters of the MRF-based phrase translation model utilizing stochastic gradient ascent based on the objective function scores and the translation scores for the translation hypotheses.

14. The method of claim 13, wherein the objective function scores are expected Bilingual Evaluation Understudy (BLEU) scores.

15. The method of claim 13, further comprising updating the parameters of the MRF-based phrase translation model responsive to received feedback.

16. The method of claim 13, further comprising optimizing respective weights for the MRF-based phrase translation model and the at least one disparate model for the SMT system.

17. The method of claim 13, further comprising:
receiving, at the SMT system, an input string in the source language;
evaluating scores of phrase translation pair hypotheses between the source language and the target language utilizing the MRF-based phrase translation model based upon a source phrase included in the input string in the source language; and
generating an output string in the target language as a function of the scores of the phrase translation pair hypotheses.

18. The method of claim 13, wherein the MRF-based phrase translation model comprises a linear combination of phrase-pair features, word-pair features, and triplet features.

19. A method of translating an input string in a source language to an output string in a target language, comprising:
extracting features of phrase translation pair hypotheses for a source phrase included in the input string in the source language, wherein the phrase translation pair hypotheses for the source phrase comprise the source phrase included in the input string in the source language and candidate target phrases in the target language, and wherein the features of the phrase translation pair hypotheses for the source phrase comprise phrase-pair features, word-pair features, and triplet features;
evaluating scores of phrase translation pair hypotheses between the source language and the target language based upon the features of the phrase translation pair hypotheses for the source phrase included in the input string in the source language utilizing a Markov random field (MRF)-based phrase translation model of a statistical machine translation (SMT) system;
evaluating disparate scores utilizing at least one disparate model based on the input string in the source language; and
generating the output string in the target language as a function of the scores of the phrase translation pair hypotheses and the disparate scores.

20. The method of claim 19, wherein a triplet feature is based on one of:
one word in a candidate target phrase and two words in the source phrase; or
two words in a candidate target phrase and one word in the source phrase.

* * * * *